US008427277B2

(12) United States Patent
Booher et al.

(10) Patent No.: US 8,427,277 B2
(45) Date of Patent: Apr. 23, 2013

(54) REMOTE CONTROL SYSTEM CONFIGURED FOR USE WITH AUTOMOBILE REMOTE KEYLESS ENTRY

(75) Inventors: Cory Booher, Columbus, IN (US); Larry D. O'Cull, Westfield, IN (US)

(73) Assignee: Booher Enterprises, Inc., Columbus, IN (US)

( * ) Notice: Subject to any disclaimer, the term of this patent is extended or adjusted under 35 U.S.C. 154(b) by 2186 days.

(21) Appl. No.: 11/440,835

(22) Filed: May 25, 2006

(65) Prior Publication Data

US 2007/0182582 A1 Aug. 9, 2007

Related U.S. Application Data

(60) Provisional application No. 60/771,141, filed on Feb. 7, 2006.

(51) Int. Cl.
*H04B 3/00* (2006.01)

(52) U.S. Cl.
USPC .......... 340/5.7

(58) Field of Classification Search .......... 340/5.8, 340/5.2, 5.7, 3.1
See application file for complete search history.

(56) References Cited

U.S. PATENT DOCUMENTS 5,113,182 A 5/1992 Suman et al.
5,555,863 A * 9/1996 Kokubu .......... 123/179.3
5,583,485 A 12/1996 Van Lente et al.
5,614,891 A 3/1997 Zeinstra et al.
5,627,529 A 5/1997 Duckworth et al.
5,661,804 A 8/1997 Dykema et al.
5,838,255 A * 11/1998 Di Croce .......... 340/825.69
6,078,271 A 6/2000 Roddy et al.
6,091,330 A * 7/2000 Swan et al. .......... 340/539.1
6,297,731 B1 10/2001 Flick
6,308,083 B2 10/2001 King
6,377,173 B1 4/2002 Desai
6,426,706 B1 7/2002 King
6,525,645 B2 2/2003 King et al.
6,795,760 B2 * 9/2004 Fuller .......... 701/36
7,023,322 B2 * 4/2006 Baumgardner et al. .......... 340/5.71
7,266,344 B2 * 9/2007 Rodriguez .......... 455/41.3
7,268,681 B2 * 9/2007 Fitzgibbon .......... 340/539.11
2002/0067245 A1 6/2002 Campbell et al.

* cited by examiner

*Primary Examiner* — Vernal Brown
(74) *Attorney, Agent, or Firm* — Maginot, Moore & Beck

(57) ABSTRACT

A device remote control system configured for use with an automobile remote keyless entry is disclosed herein. The device is specifically configured for use in association with a remote keyless entry key fob. The key fob is operable to transmit at least one automobile instruction signal, such as a door lock signal, door unlock signal, trunk release signal, or other automobile instruction signal. The device comprises a receiver, a processor, and a transmitter. The receiver is configured to receive the automobile instruction signal transmitted by the key fob and deliver the signal to the processor. The processor analyzes the signal and determines whether it is an appropriate signal indicating that a device such as a garage door should be opened or closed. The transmitter is configured to transmit a device operation signal in response to the processor when the processor indicates that the device should be operated.

1 Claim, 3 Drawing Sheets

REMOTE CONTROL SYSTEM CONFIGURED FOR USE WITH AUTOMOBILE REMOTE KEYLESS ENTRY

CROSS-REFERENCE TO RELATED APPLICATIONS

This application claims priority from U.S. provisional application No. 60/771,141, filed Feb. 7, 2006, which is incorporated herein by reference in its entirety.

FIELD

This invention relates to the field of remotely controlled devices and remote keyless entry systems, and more particularly, to remote keyless entry systems also configured to operate automatic garage door openers, lights, and other remotely controlled devices.

BACKGROUND

Consumers desire the ability to control many devices remotely in the modern world. Automatic garage door openers are one example of such devices. Automatic garage door openers are widely used to open and close garage doors. Automatic garage door openers include a transmitter and a receiver. The transmitter is a wireless remote device that includes a button. Upon activation of the button, the transmitter sends a garage door operation code to the receiver mounted within the garage. Upon receipt of the code, the receiver instructs a motor to open or close the garage door.

While garage door openers are convenient, there are times when homeowners and other users would like to open or close a garage door in the absence of the wireless transmitter for the garage door opener. For example, when a homeowner leaves the home and walks to a nearby location, he or she may prefer to enter by the garage upon his or her return. However, without the garage door opener transmitter, entry by the garage is prohibited unless the homeowner has installed a special exterior keypad transmitter. Another common situation is when the homeowner removes the wireless transmitter from his or her automobile for some reason and forgets to replace the transmitter before returning home. In such a case, a homeowner may have removed the wireless transmitter from his or her automobile and given the transmitter to a friend who needs access to the home. If the homeowner does not recover the wireless transmitter from the friend before returning home, he or she will be unable to enter the garage upon initially pulling up to the garage, as would be possible with the wireless transmitter. Accordingly, it would be desirable to provide an alternative transmitter allowing a user to operate an automatic garage door opener. It would also be desirable for the alternative transmitter to be provided on a device that is commonly used in association with automobiles and home entry in general, such that the homeowner typically carries the device on his or her person when away from the home.

Most automobiles today are sold with remote keyless entry (RKE) systems. For those automobiles not equipped with RKE systems, such systems may be purchased in the aftermarket. RKE systems generally include a wireless transmitter and a receiver located within the automobile. The wireless transmitter is commonly referred to as a key fob. The key fob is configured to hold a plurality of keys, such as keys on a key ring. The key fob may be separate from a key or may even be incorporated with a key as a single unit. In any event, the key fob typically includes one or more buttons that may be activated. Depression of one of the buttons on the key fob causes the wireless transmitter to transmit an automobile instruction signal associated with the button to the receiver within the vehicle. For example, depression of a door lock button on the key fob will result in transmission of a door lock instruction signal. Examples of other buttons having associated automobile instruction signals include trunk release buttons, unlock buttons, alarm buttons, panic buttons, and remote start buttons.

RKE systems use a particular government or industry designated frequency (or limited number of frequencies) to transmit their signals, which may vary from country to country. A general design challenge for RKE systems is to achieve low power consumption in both the RKE transmitter and receiver, while achieving good range and reliability for the RKE system.

Another design challenge for RKE systems is code security. When an RKE system transmits only a single or limited number of codes it is possible for a radio scanner to capture the code. Once the code is captured, a thief may retransmit the code to the automobile in order to gain access. Thus many modern RKE systems use a 40-bit rolling code to assist with security.

With a 40-bit rolling code approximately 1 trillion codes are available for a given instruction. The transmitter's controller chip has a memory location that holds a current 40-bit code. When a button on the key fob is pressed, it sends that 40-bit code along with an automobile instruction code that tells the car what to do (such as lock the doors or open the trunk). The receiver's controller chip also has a memory location that holds the current 40-bit code. If the receiver gets the 40-bit code it expects, then it performs the requested function. If not, the receiver does nothing. The key fob transmitter and the automobile receiver use equivalent pseudo-random number generators. When the transmitter sends a 40-bit code, it uses the pseudo-random number generator to pick a new code, which it stores in memory. On the other end, when the receiver receives a valid code, it uses the pseudo-random number generator to pick a new one. To avoid problems associated with lost transmissions, the receiver will accept any of a predetermined number of next possible codes (e.g., any of the next 256 possible valid codes).

Key fob owners typically also attach vehicle keys and home keys to the key fob. This means that the RKE key fob is typically carried by homeowner when leaving home, whether the homeowner leaves by vehicle or on foot. Thus, the RKE key fob presents unique opportunities for an alternative device that may be used as a garage door transmitter or other controller for any of numerous different devices that may be remotely controlled.

SUMMARY

A garage door opening system configured for use with an automobile remote keyless entry is disclosed herein. The device is specifically configured for use in association with a RKE key fob. The key fob is operable to transmit at least one automobile instruction signal, such as a door lock signal, door unlock signal, trunk release signal, or other automobile instruction signal.

The device disclosed herein comprises a receiver, a processor, and a transmitter. The receiver is configured to receive the automobile instruction signal transmitted by the key fob and deliver the signal to the processor. The transmitter is configured to transmit a garage door operation signal in response to the processor when the received automobile instruction signal indicates that the garage door should be operated.

After the automobile instruction signal is received by the receiver, it is processed by the processor. The processor is operable to recognize the received automobile instruction signal and instruct the transmitter to transmit the garage door operation signal. In one embodiment, the processor uses a signature recognition technique to identify the received automobile instruction signal as associated with a particular key fob of the RKE system of the automobile. If the received signal is associated with a particular key fob, the processor authorizes transmission of a garage door operation signal.

In one embodiment, the processor is also used to determine whether the received signal is one that is actually intended as a garage door operation signal. For example, the processor may only consider signals that are transmitted for a predetermined amount of time, or transmitted a predetermined number of times over a given period, to be signals instructing the garage door to open or close. If the processor is not able to identify the signal as one intended as a garage door open signal, the garage door operation instruction is not sent. However, if the processor identifies the signal as one intended as a garage door open signal, and the signal is also identified as associated with the key fob, the garage door operation instruction is sent.

DESCRIPTION

Figure 1:
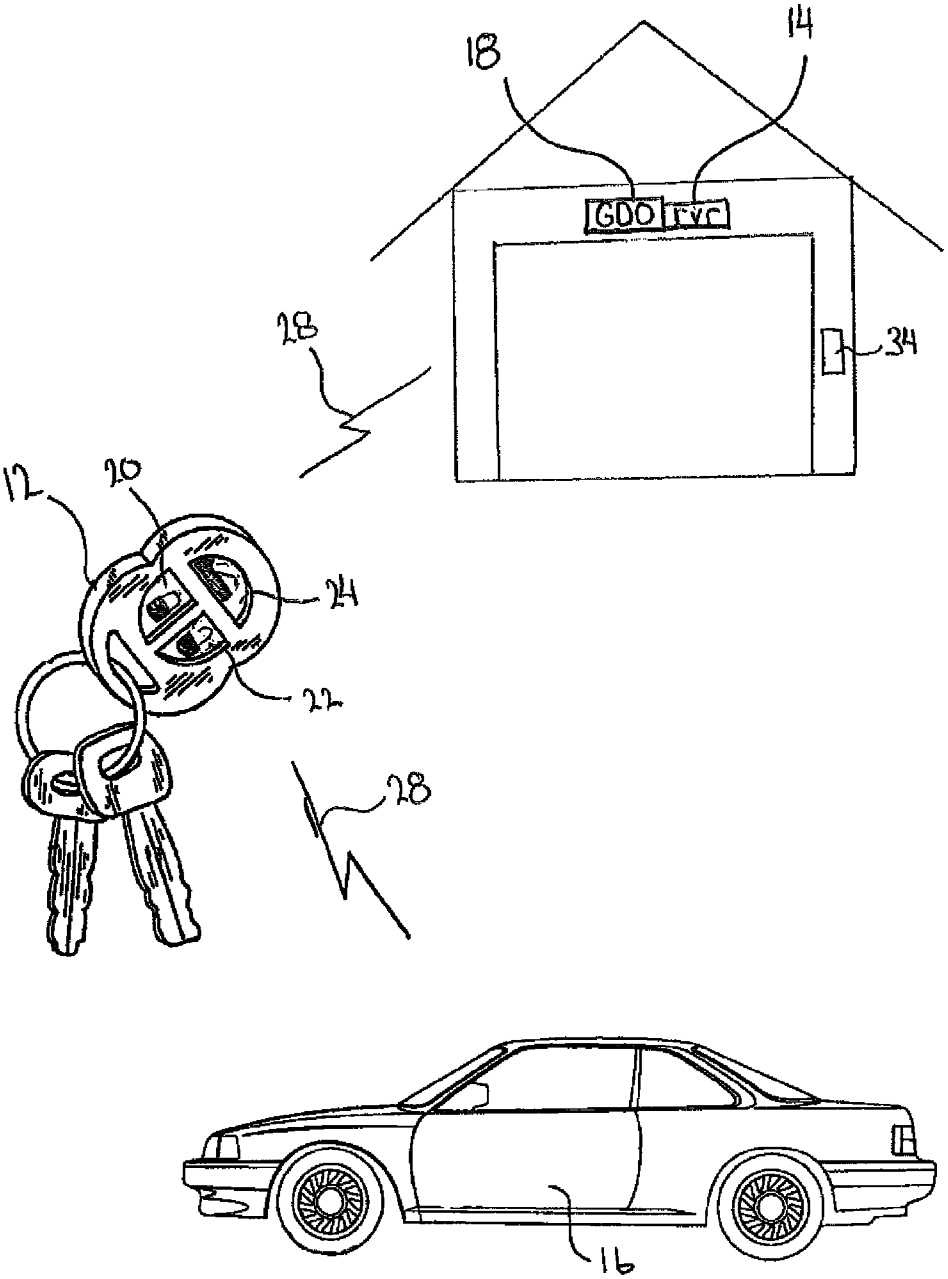
FIG. 1 shows representation of a key fob of a remote keyless entry system for an automobile and an associated garage door opening system configured for use with the key fob.

With reference to FIG. 1, a remote control system 10 configured for use with an automobile remote keyless entry is shown. The remote control system 10 is shown in the context of an automobile remote keyless entry system configured for use with a garage door opener. The system 10 comprises a key fob 12 in communication with a remote receiver device 14. As explained in further detail herein, the key fob 12 is configured to transmit an automobile instruction signal 28, and the remote receiver device 14 is configured to receive the automobile instruction signal. The receiver device 14 is operable to transmit a garage door operation signal to a garage door opener 18 in response to the received automobile instruction signal 28. As used herein the term “automobile instruction signal” refers to a signal instructing an associated vehicle to perform a given function, such as unlock the vehicle doors, lock the vehicle doors, release the trunk, set the vehicle alarm, or other vehicle functions.

With continued reference to FIG. 1, the key fob 12 is a standard key fob for use with an automobile 16. Such key fobs are typically sold with new automobiles, but may also be sold in the aftermarket. The key fob 12 includes a plurality of automobile instruction buttons, such as a door lock button 20, a door unlock button 22, and a trunk release button 24. However, different key fobs will include different buttons, and are not limited to those buttons shown in FIG. 1. In addition, while buttons that may be physically depressed are standard on most key fobs, numerous other activation devices may be used instead of buttons such as switches, sensors, voice recognition devices, or other devices activated by the user in an attempt to send a signal. Furthermore, the key fob may be presented in numerous forms, such as provided on a ring with other keys, as shown in FIG. 1, or incorporated as a single unit with a particular key.

The key fob 12 includes a signal transmitter. Upon activation of a button 20-24 on the key fob 12, the transmitter transmits an automobile instruction signal 28 from the key fob 12. The automobile instruction signal 28 is a low power signal sent over a designated frequency. Because the signal is low power, it is typically only received by the automobile within a certain range, such as 100 feet.

When the automobile 16 receives the automobile instruction signal 28 transmitted from the key fob 12, the automobile 16 automatically performs the function associated with the received signal. For example, when the door lock button 20 is depressed on the key fob 12, and the door lock signal is received by the automobile 16, the doors of the automobile are automatically locked. When the door unlock button 22 is depressed, and the door unlock signal is received by the automobile, the doors of the automobile are automatically unlocked. Likewise, when the trunk release button 24 is depressed, and the trunk release signal is received by the automobile, the automobile trunk is automatically released.

Figure 2:
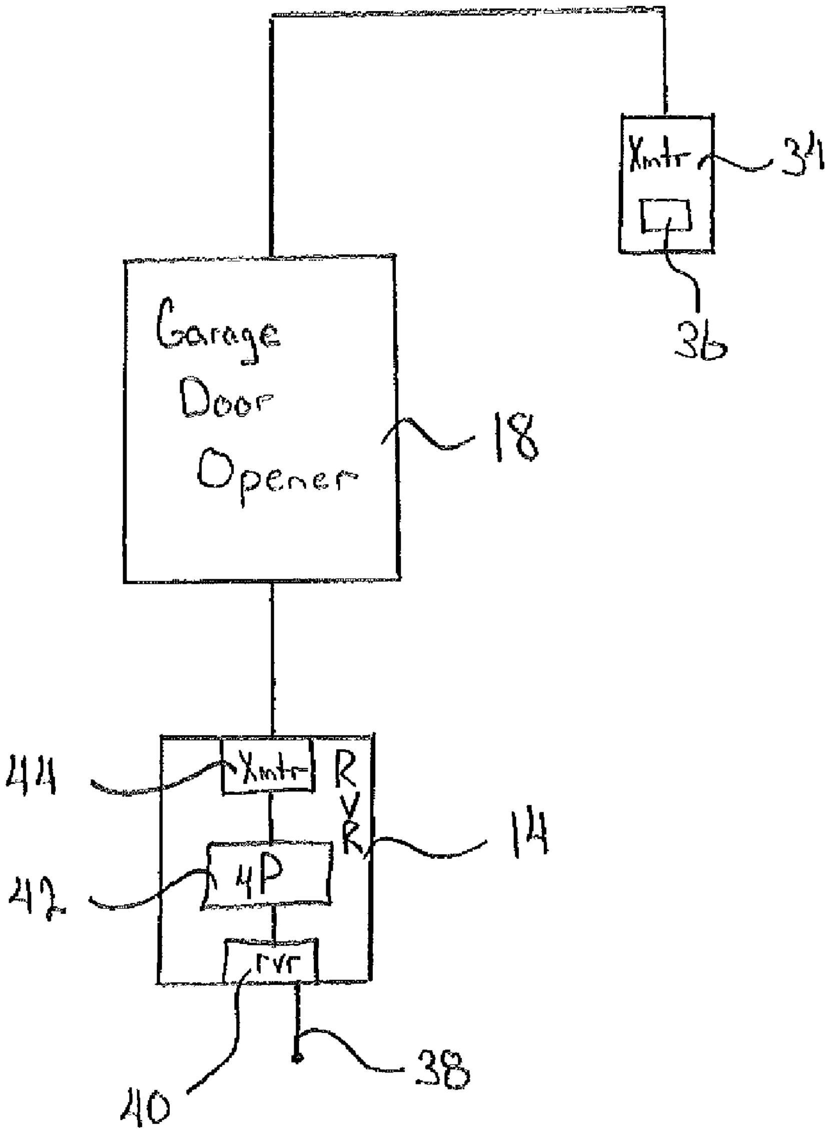
FIG. 2 shows a schematic diagram of the garage door opening system of FIG. 1.

With reference now to FIG. 2, the receiver device 14 is connected to the garage door opener 18 via a communication line. Alternatively, communications between the receiver device 14 and the garage door opener 18 may be provided via a wireless connection. A signal transmitter 34 is also provided in association with the garage door opener 18. The signal transmitter 34 is typically fixed in place, such as mounted to a wall inside the garage, and connected to the garage door opener 18 via a wire. Activation of a button 36 causes the signal transmitter 34 to deliver a garage door operation instruction signal to the garage door opener 18, resulting in motor operation to open or close the garage door. For example, the garage door operation instruction signal may result in closure of a dry switch which provides power to the motor, and results in motor operation. In addition, or alternatively, the signal transmitter 34 may be fixed to an exterior garage wall and entry of a code upon a keypad will result in a wireless garage door open/close instruction being sent to the garage door opener 18.

As mentioned above, the receiver device 14 is in communication with the garage door opener 18 via a physical wire or a wireless connection. The receiver device 14 is typically mounted within the garage in close proximity to the garage door opener 18. However, the receiver device 14 may also be provided in other locations when a wireless connection is available between the receiver device 14 and the garage door opener 18. For example, the receiver device may be located within the automobile 16.

The receiver device 14 includes a receiver 40, a processor 42, and a transmitter 44. The receiver is configured to receive wireless signals via an antenna 38. The receiver device may also include a memory for storing data associated with recently received signals. For example, data may be stored in the memory concerning the past few seconds of signal data received by receiver 40. Signals received by the receiver are passed on to the processor 42 for analysis. As explained in further detail below, the memory may also be used to store other data, such as digital signature data for signals sent from the key fob.

The processor 42 processes the signals received by the receiver 40 using internal software and determines whether each received signal is an automobile instruction signal that was transmitted from the key fob 12. To this end, upon initial system 10 set up, the user is asked to transmit an automobile instruction signal from the key fob 12 to the receiver 40. The processor then processes the automobile instruction signal from the key fob 12, and stores such signal, or data relating to such signal, in the memory. Such stored signal or signal data may be referred to herein as the "memorized signal." Thereafter, when a new signal is received, the processor determines whether the data for the new signal matches the data for the memorized signal. If the received signal matches the memorized signal, the new signal is identified as being an automobile instruction signal 28 transmitted from the key fob 12. In addition to determining whether the new signal matches the memorized signal, the processor also performs a subroutine to determine whether the new signal should be considered an instruction to operate the garage door such that a garage door open/close signal should be transmitted to the garage door opener 18. Such a subroutine is explained in further detail below with reference to FIG. 3. If a garage door open/close signal is to be transmitted to the garage door opener, the microprocessor delivers a signal to the transmitter, instructing the transmitter to deliver the garage door open/close signal to the garage door opener 18. In one embodiment, the garage door open/close signal is a coded signal delivered wirelessly to the garage door opener. In another embodiment the garage door open/close signal is a switch control signal intended to open or close a switch in the garage door opener, thus resulting in operation of the garage door motor such that the garage door is opened or closed.

Figure 3:
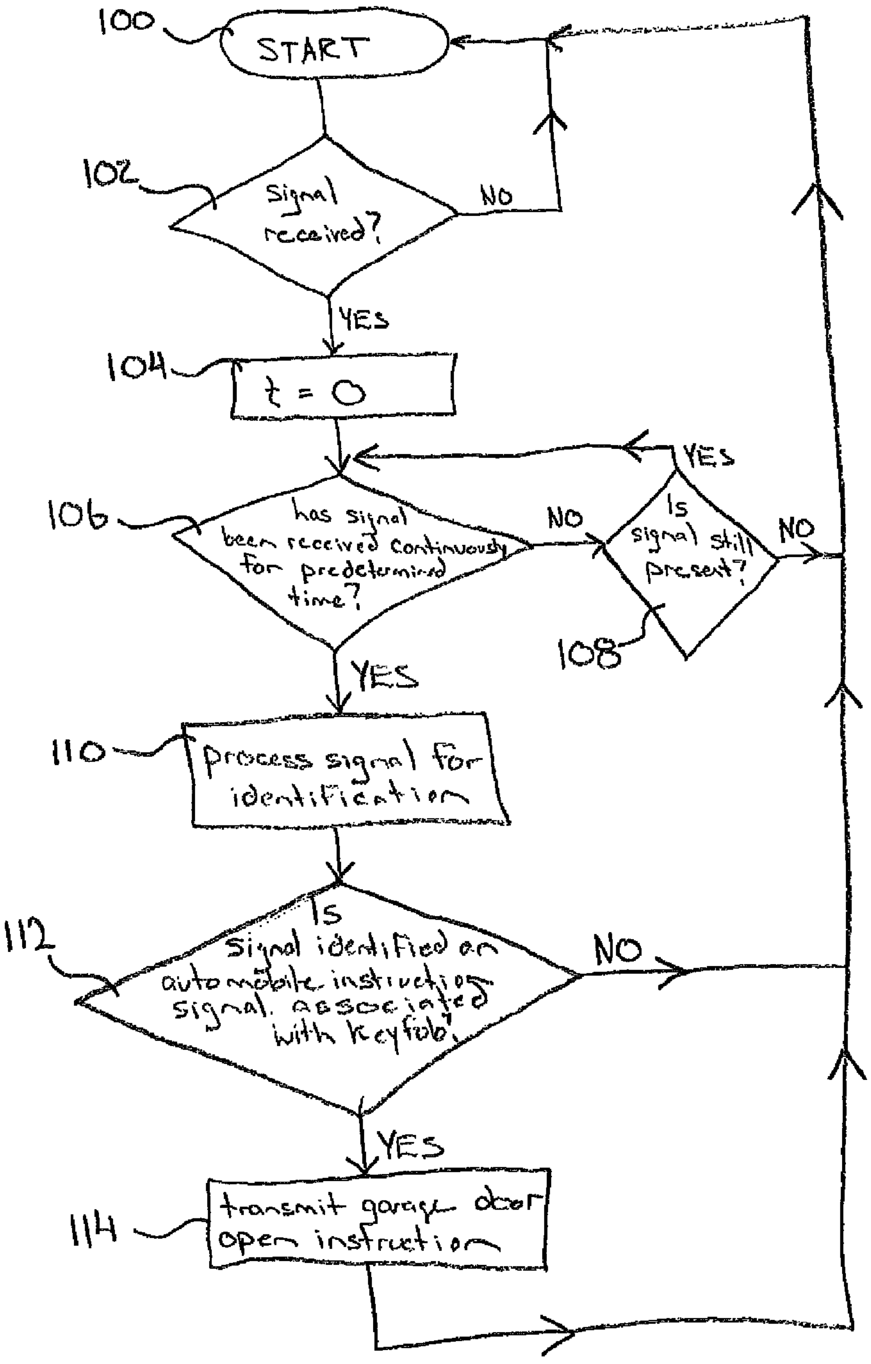
FIG. 3 shows a flow chart of a series of steps employed by a processor of the garage door opening system of FIG. 1.

With reference now to FIG. 3, a flowchart is provided showing an exemplary series of steps performed by the processor 42 to determine whether a garage door open instruction signal should be sent to the transmitter 44. The process begins with step 102, where the processor simply determines whether a new signal has been received by the receiver device 14. If a new signal has been received, the processor sets a clock to zero in step 104. Then, in step 106, the processor determines whether the new signal has been received continuously for a predetermined period of time, such as two seconds. If the new signal has not been received continuously for the predetermined period of time, in step 108 the processor determines if the signal is still present. If the signal is no longer present, the process returns to step 100 and starts the process again. However, if the signal remains present, the process returns to step 106 to determine whether the signal has been received continuously for the predetermined period of time.

After the processor determines that the new signal has been received continuously for the predetermined period of time, the processor moves to step 110 where a signal identification subroutine is performed. The signal identification subroutine is designed to determine whether the received signal is an automobile instruction signal originating from the particular key fob 12 designed for use in association with the automobile 16. In one embodiment, the signal identification subroutine may be configured to identify only one of the automobile instruction signals transmitted from the key fob, such as the door lock signal. However, in an alternative embodiment, the signal identification subroutine is configured to identify any of the plurality of automobile instruction signals that may be transmitted from the key fob, including the door lock signal, the door unlock signal, the trunk release signal, and other signals.

If the received signal is not identified as originating from or otherwise being associated with the key fob in step 112, the system returns to step 100 and the process begins again. However, if the signal is identified as originating from or otherwise being associated with the key fob, the process moves to step 114 where the processor delivers a garage door operation signal to the transmitter. Transmission of the garage door operation signal, either through a wire or wirelessly, results in operation of the garage door motor, which moves the garage door either up or down. After the garage door operation signal is delivered, the system returns again to step 100 and awaits receipt of another signal.

In one embodiment, the signal identification subroutine of step 110 is simply a subroutine that identifies one or more of the codes transmitted from the key fob. However, such subroutines may not be practical or effective with many modern key fobs, such as those key fobs that use rolling codes for security purposes. Thus, in another embodiment, the signal identification subroutine utilizes signature recognition technology to identify an automobile instruction signal transmitted from a particular key fob.

Signature recognition technology is based in part on the concept that every radio transmitter puts out a slightly different signal shape at turn-on due to the various tolerances of the components. The slight variation in the signal shape is like a fingerprint that allows a transmitter to be individually recognized, even though hundreds or thousands of similar transmitters may have been produced.

Transmitters in key fobs are particularly available for signature recognition technology, as each automobile manufacturer does signaling and encryption in their own way. Furthermore, signaling and encryption will also vary from model to model, and even from year to year within a given model. In addition, the transmitters in key fobs are typically turned on with every press of a button, making digital signatures available with every button press.

There are several variables that are useful when determining a digital signature in a key fob. These variables include, for example, bit rate timing used by the key fob, preamble and header data format and size, gaps in the data bit stream, and the radio frequency itself. Accordingly, when an automobile instruction signal is received by the receiver device 14, the data pattern for the received signal is analyzed by the processor. If the digital signature data for the received signal matches digital signal signature data stored in memory as being associated with the key fob 12, the received signal is considered to be associated with the key fob and may considered to be a garage operation instruction. If the digital signature does not match the digital signature stored in memory, the signal is rejected as not being associated with the key fob, and can not be used to operate the garage door associated with the receiver device.

One of skill in the art will recognize that various digital signature recognition techniques and other related signal recognition methods are available for use with automobile instruction signals transmitted from key fobs. One digital signature/identification technique that may be used to identify signals transmitted from the key fob involves combining timing measurements with spectral analysis of the signal. In addition, there are audible components that make up the "din" or "timbre" of a key fob, which help to further identify signals transmitted from one key fob from those transmitted by another. With a combination of a key fob's frequency of operation, its digital signature, and its audio spectrum, a method of identifying a signal with a particular key fob is possible with very little chance of misidentification. This fingerprinting technique when used in combination with a small receiving radius such as twenty to thirty feet, results in even lower chances of signal misidentification.

In one embodiment of the system, such as that shown in FIG. 3, the processor does not attempt to determine if any particular one of the key fob buttons have been pressed when determining whether to deliver a garage door operation instruction. Instead, the processor only attempts to determine whether the received signal is from the particular key fob, and whether the signal is such that it indicates that the garage door should be operated. In other words, the processor will not attempt to distinguish whether the signal is a door lock, door unlock, trunk release or other signal from the designated key fob. Instead the processor only determines whether the received signal is from the designated key fob and whether the received signal is consistent with a garage door open instruction. For example a signal consistent with a garage door open instruction is a signal that has been continuously received for a predetermined period of time or has been received a certain number of times within a predetermined period. In such embodiment, the user may press the door lock button, door unlock button, or any of the other key fob buttons in an attempt to open the garage door. The user only needs to press the buttons in a manner consistent with a garage door open instruction, such as holding the button down for a predetermined period of time, in order for the signal to be interpreted as a garage door operation signal. When this is done, and the signal is recognized as associated with the key fob, the garage door will be opened or closed.

A general overview of the operation of the device is now provided in summary. With reference again to FIG. 1, the receiver device 14 is first positioned in association with a device to be remotely controlled, such as a garage door opener. The receiver device includes a transmitter configured to deliver a device operation signal which is intended to provide some instruction for the device or otherwise control operation of the device, such as opening or closing a switch associated with the device. Thus, the transmitter is positioned to transmit this device operation signal to the device to be controlled, or a switch associated with such device, either over a wire or via a wireless transmission. Transmission of the device operation signal will result in some operation of the remotely controlled device following receipt of the operation signal, provided such remotely controlled device is operating properly. For example, in one embodiment, transmission of the device operation signal results in closure of a dry contact or solid state electronic contact, thus providing power to the remotely controlled device.

With continued reference to FIG. 1, where the remotely controlled device is a garage door opener, when a user presses a button on the key fob 12, the key fob transmits an associated automobile instruction signal 28. The receiver device 14 is designed with limited power such that the receiver 40 can only receive the transmitted automobile instruction signal 28 within a limited radius, such as within thirty feet of the receiver 40. By limiting the power of the receiver device 14, most signals from other key fobs will not be received, and the chances for generation of faulty garage door operation signals will be reduced. For example, a door unlock signal from a key fob associated with an automobile parked in a neighboring drive will not be received by the system, provided the neighboring key fob is not within thirty feet of the receiver. Accordingly, the system will not need to determine whether such neighboring automobile instruction signal is requesting operation of the garage door. On the other hand, if a user is within the reception area for the receiver 40, the automobile instruction signal 28 transmitted by the key fob 12 will be received by the receiver device 14. If the received automobile instruction signal is identified as associated with the key fob 12, the receiver device 14 passes a garage door operation (open/close) signal on to the garage door opener. In this fashion automobile instruction signals from a key fob may also be used to open or close a garage door. Thus, a system is provided where a standard automobile key fob may also be used as a garage door opener.

Although the above-described embodiment of the invention contemplates that a garage door operation instruction/signal will be sent by pressing a button on the key fob for a predetermined period of time, other actions may be used to indicate that a garage door operation signal should be sent. For example, the user could use a series of rapid key fob button depressions, such as three button depressions within three seconds, to indicate a garage door operation signal should be sent. In this case, the receiver device would need to receive three distinct signals from the key fob within three seconds to indicate that the garage door operation signal should be sent. In any case, by pressing the key fob button, the key fob sends an automobile instruction signal and the user implemented pattern of this signal indicates to the receiver device that the automobile instruction signal should be interpreted as a garage door operation instruction.

In another alternative embodiment of the invention, the receiver device 14 may be used to operate one or more devices other than an automatic garage door openers. In particular, the receiver device may be used in association with an interior home light, an exterior light, an automatic security gate, a lawnmower, a boat, or any other device that the user wishes to remotely control that is not associated with an automobile. As used herein, the term "non-automotive remotely controlled device" refers to such devices that are not associated with an automobile. For example, if the receiver device is used in association with an exterior light, the receiver is positioned in communication with a switch controlling the light. When a lock button or other key fob button is pressed for a predetermined period of time, the receiver device is operable to operate a switch, such as by closing a dry contact, thus turning on the exterior light. Therefore, in the fashion described above for automatic garage door openers, the receiver device is configured to store signature data of an automobile instruction signal sent from a wireless key fob, receive the transmitted automobile instruction signal, identify the received automobile instruction signal, and deliver a remotely controlled device operation instruction when the received automobile instruction signal meets a predetermined criteria.

Although the present invention has been described with respect to certain preferred embodiments, it will be appreciated by those of skill in the art that other implementations and adaptations are possible, as noted above. Moreover, it should be recognized that there are advantages to individual advancements described herein that may be obtained without incorporating other aspects described above. Therefore, the spirit and scope of the appended claims should not be limited to the description of the preferred embodiments contained herein.

What is claimed is:

1. A method of controlling a non-automotive remotely controlled device using a key fob configured to transmit an automotive instruction signal, the method comprising:

receiving the automotive instruction signal transmitted from the key fob;

identifying the received automotive instruction signal; and transmitting a control signal for the non-automotive remotely controlled device following identification of the received automotive instruction signal if the automobile instruction signal is received in a manner that meets a predetermined criterion indicating that the automotive instruction signal is intended to also control the non-automotive remotely controlled device.

* * * * *